June 16, 1964  G. M. RAPATA  3,137,109
METHOD OF MAKING A CARRIER FOR CONTAINERS
Filed May 26, 1961  5 Sheets-Sheet 1
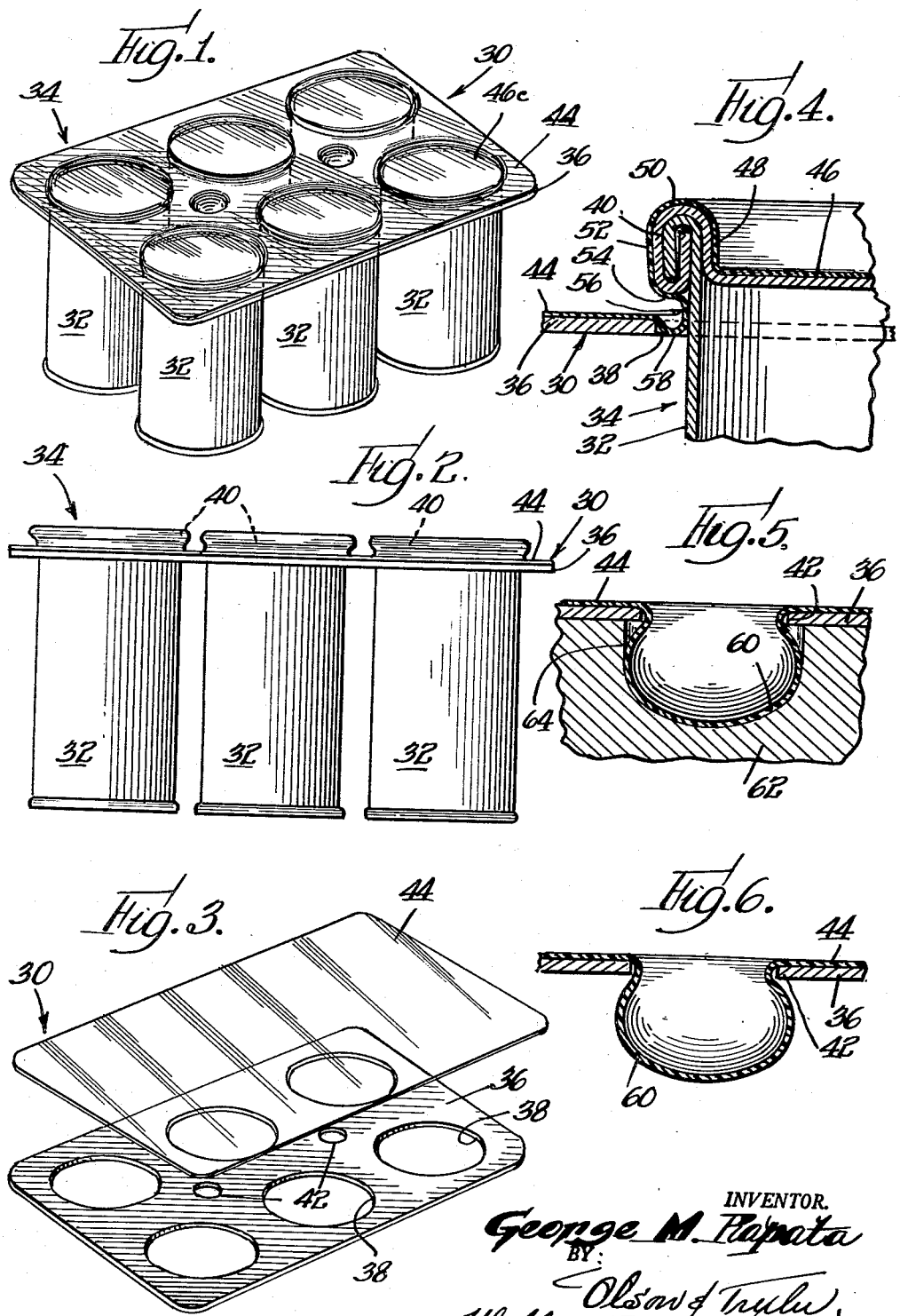

June 16, 1964            G. M. RAPATA            3,137,109
METHOD OF MAKING A CARRIER FOR CONTAINERS
Filed May 26, 1961                                        5 Sheets-Sheet 2
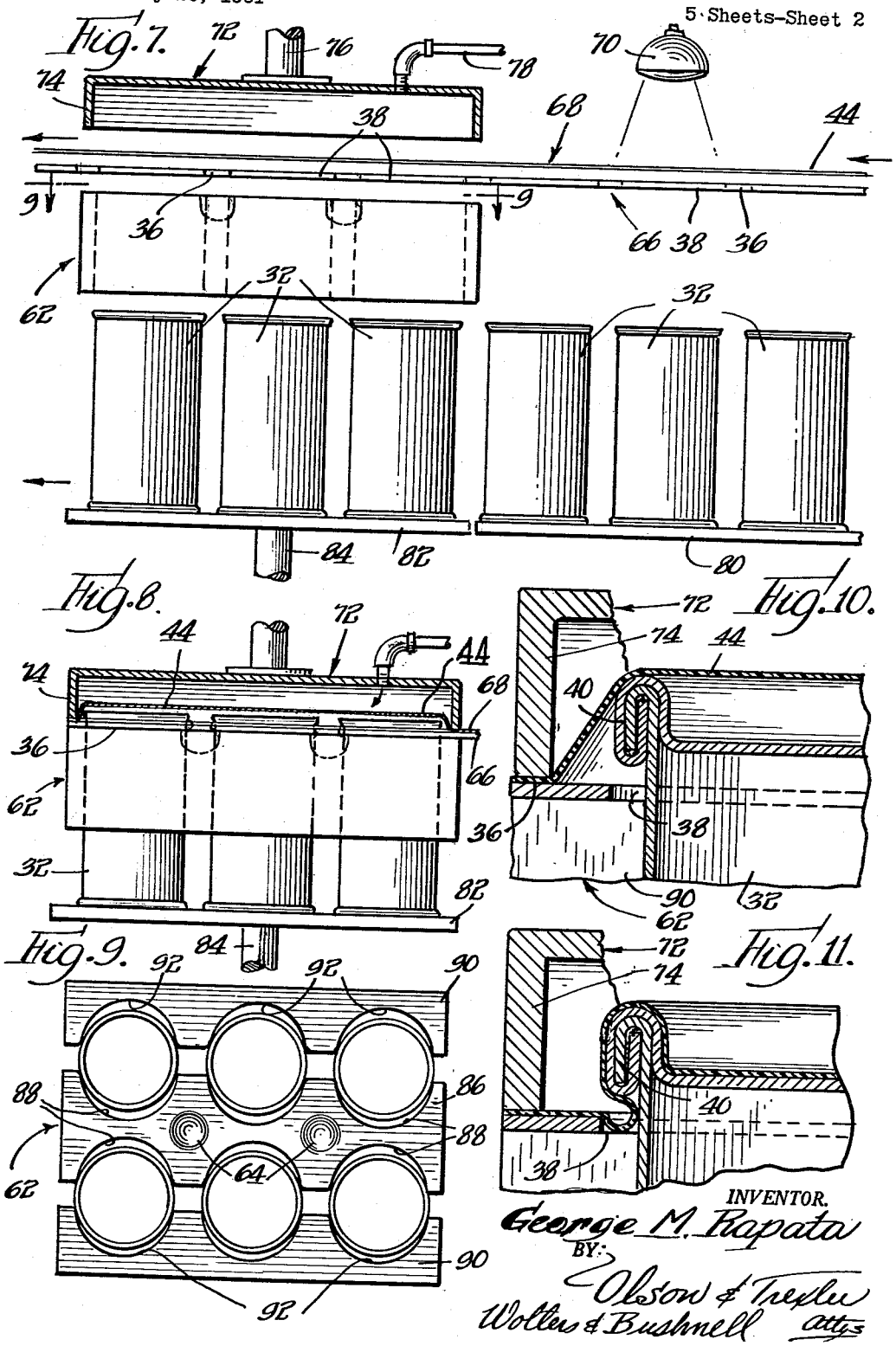
INVENTOR.
George M. Rapata June 16, 1964  G. M. RAPATA  3,137,109
METHOD OF MAKING A CARRIER FOR CONTAINERS
Filed May 26, 1961  5 Sheets-Sheet 3
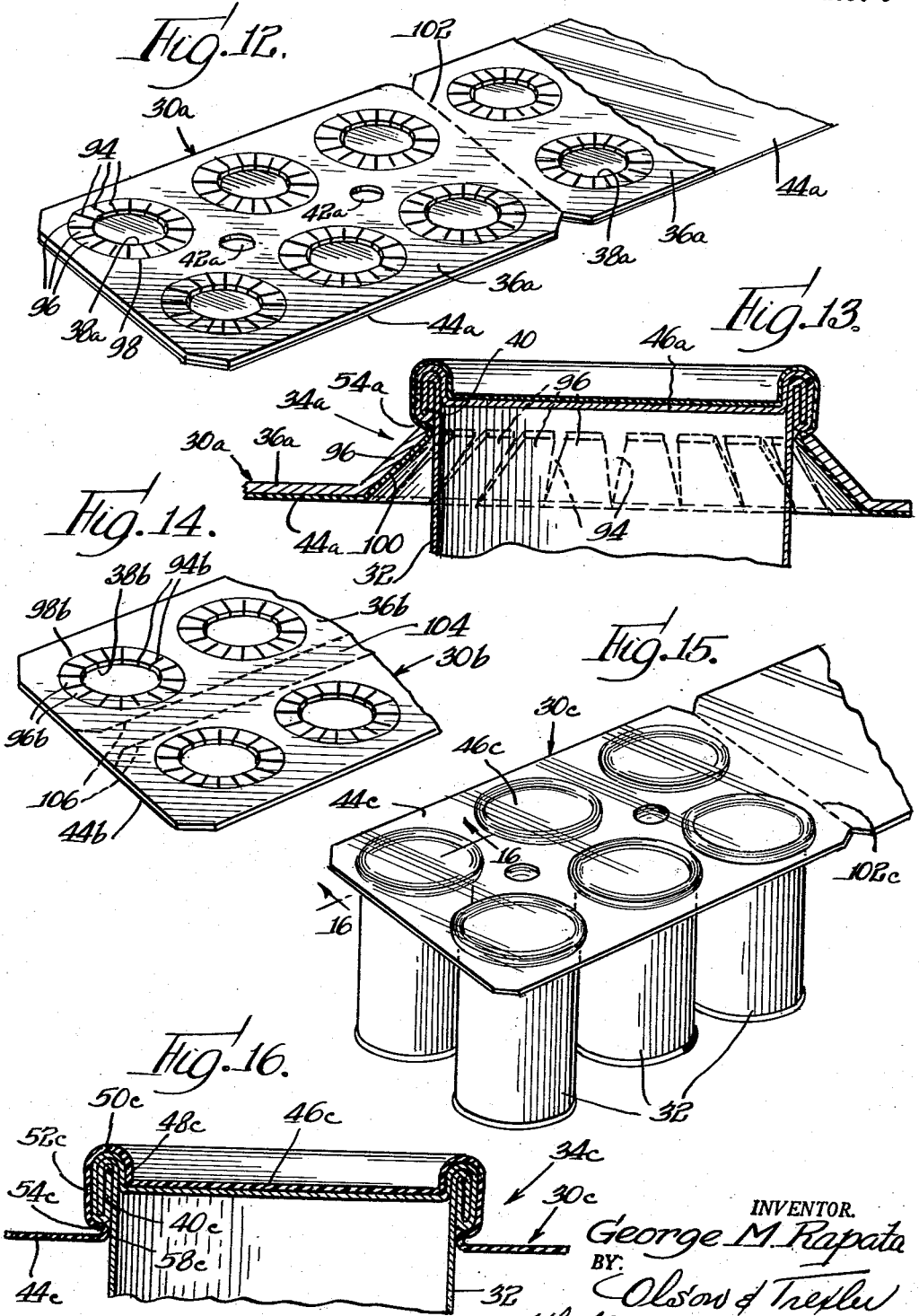

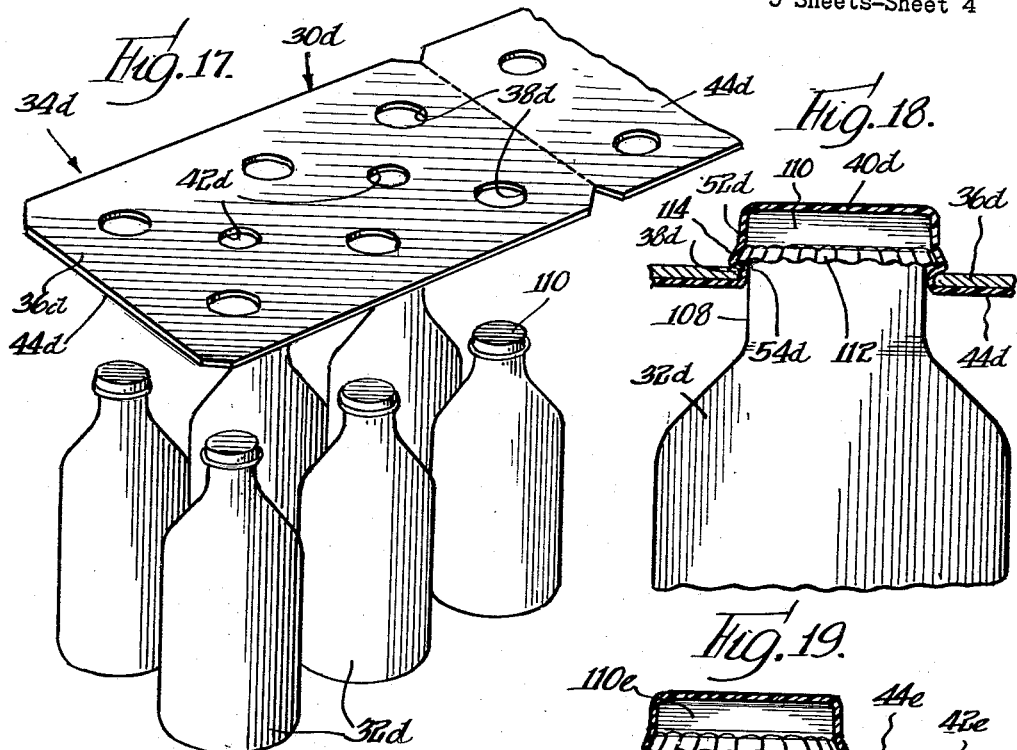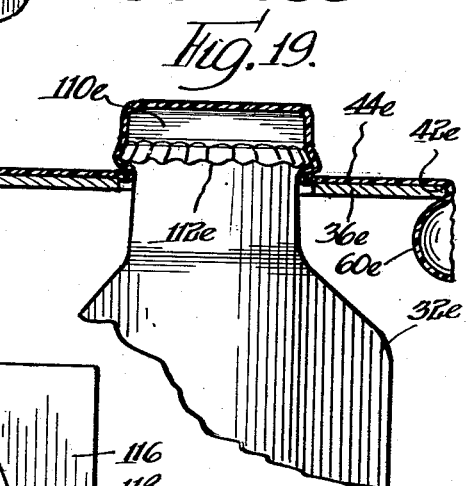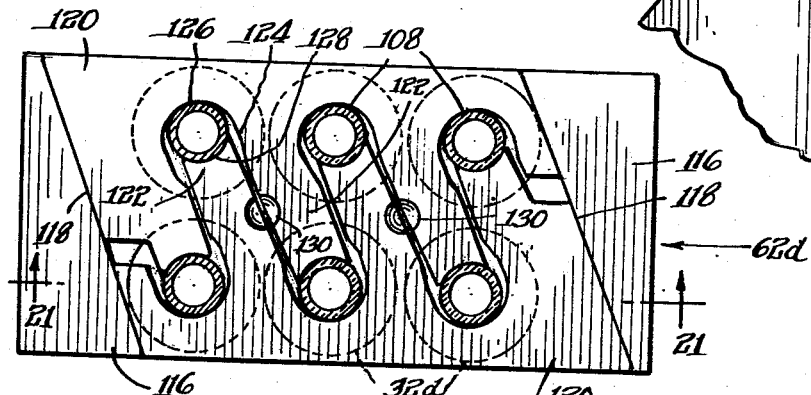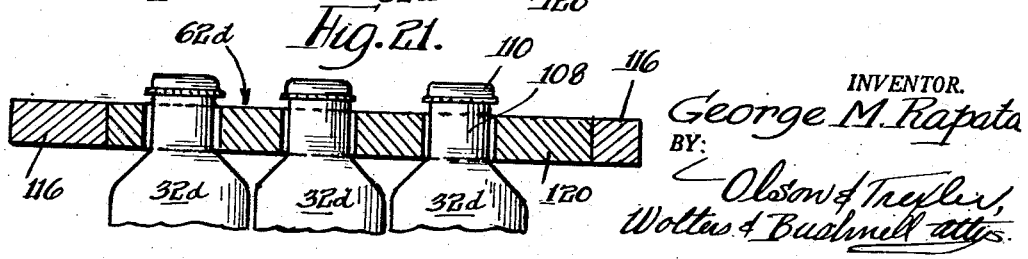

June 16, 1964    G. M. RAPATA    3,137,109
METHOD OF MAKING A CARRIER FOR CONTAINERS
Filed May 26, 1961    5 Sheets-Sheet 5
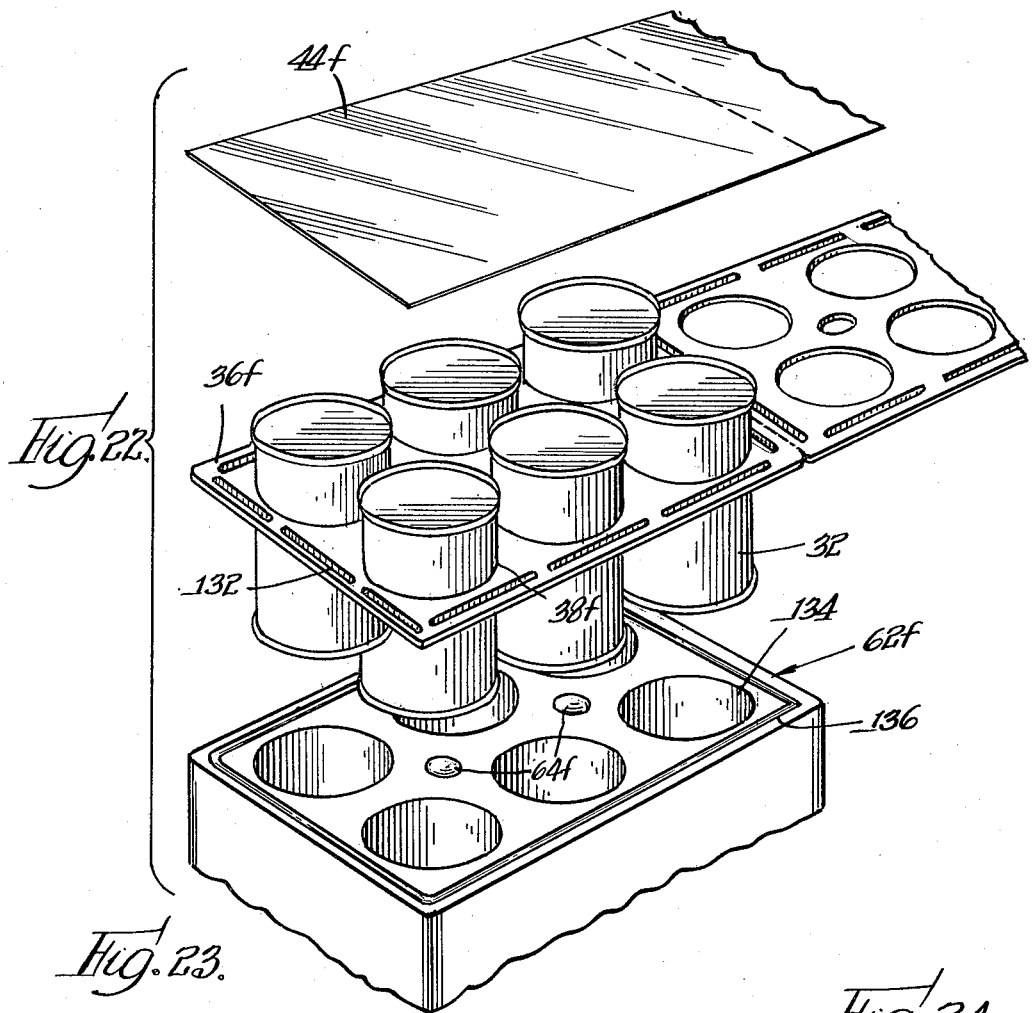
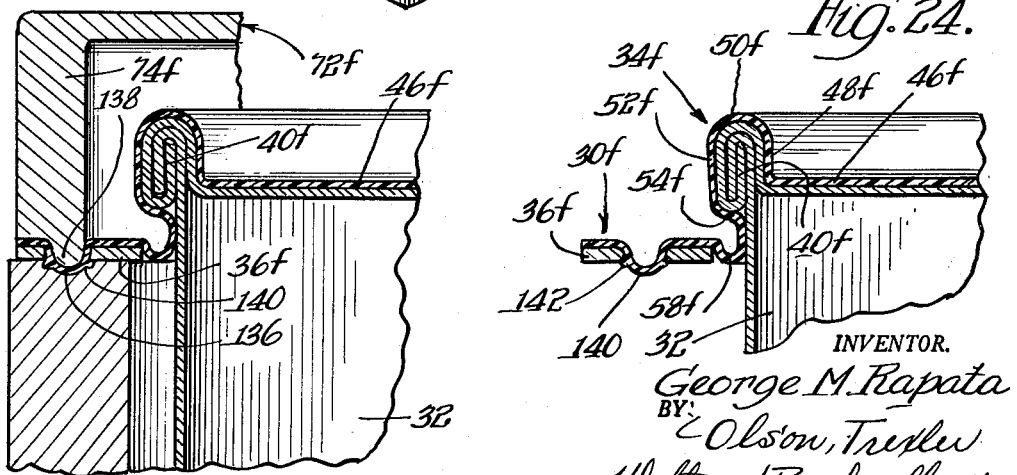
INVENTOR.
George M. Rapata

United States Patent Office 3,137,109
Patented June 16, 1964

3,137,109
METHOD OF MAKING A CARRIER
FOR CONTAINERS
George M. Rapata, Park Ridge, Ill., assignor to Illinois
Tool Works Inc., a corporation of Delaware
Filed May 26, 1961, Ser. No. 112,933
6 Claims. (Cl. 53—48)

This invention is concerned generally with the art of carrying containers, and more particularly with an improved process or method of producing an improved container carrier and resulting package of containers and carriers.

It has become rather common practice to provide packages of a half dozen or so cans or bottles and a carrier assembled therewith. Probably the earliest of these were of paper or pasteboard, but these have not proved entirely satisfactory. Carriers made of paper or pasteboard generally either have not held the containers sufficiently surely, or have held the containers so well that it has been extremely difficult to remove the containers from the carriers. Metal clips also have been used in connection with beaded cans, but these have not, in general, proved entirely commercially acceptable as yet.

Probably the most desirable carrier and package yet devised is the type first disclosed in Poupitch U.S. Patent 2,874,835. In this patent, a sheet of resilient, flexible plastic is provided with apertures slightly smaller than the containers with which the carrier is to be associated. The containers are pushed through the apertures, causing them to stretch about the containers, and resiliently to grip the containers quite aggressively. The containers are held most securely, and yet are readily removed when desired by pulling them up through the carrier sheet in the same direction in which they are installed, or by pulling sideways on a container further to stretch the sheet.

The carrier in accordance with the aforesaid Poupitch patent comprises a single sheet of unsupported plastic material. It is possible that extremely heavy containers carried thereby would move about more than would be desirable. Furthermore, the tops of the containers are exposed to the atmosphere. This is generally not objectionable. However, there are some instances in which it is preferable to maintain the top of the container, particularly a can, protected from the atmosphere. For example, beverages are often sold in cans, and such beverages may be consumed, as on picnics, directly from the can through holes punched in the top thereof. For sanitary reasons, it is preferable that the tops should be protected.

Accordingly, it is an object of this invention to provide a method of manufacturing a container carrier and resulting package wherein the carrier is made of plastic supported by a more rigid member.

It is another object of this invention to provide a method of manufacturing a container carrier and package wherein the containers have the tops thereof protected from the atmosphere.

It is still another object of this invention provide a method of manufacturing a carrier for containers and a resulting package wherein the carrier is of a laminated construction, and the laminae mutually cooperate to form a superior package.

Another object of this invention is to provide a method of manufacturing a laminated carrier and package wherein the laminae physically interlock and are held together.

It is further an object of this invention to provide improved methods for assembling the improved carrier with containers.

Other and further objects and advantages of the present invention will be apparent from the following description when taken in connection with the accompanying drawings wherein:

FIGURE 1 is a perspective view of a package comprising the novel carrier and a plurality of cans, in accordance with the principles of this invention;

FIG. 2 is a side elevational view thereof;

FIG. 3 is a perspective view showing the parts of the carrier;

FIG. 4 is a detail vertical sectional view on an enlarged scale of an upper portion of one of the cans and the carrier;

FIG. 5 is a detail sectional view showing formation of a carrying means for the carrier and interlocking of the parts thereof;

FIG. 6 is a detail sectional view similar to FIG. 5 showing the completed finger gripping carrying means for the carrier;

FIG. 7 is a side view, partly in vertical section, illustrating the apparatus and method for assembling the parts of the carrier with the containers;

FIG. 8 is a view similar to a part of FIG. 7 in a subsequent stage;

FIG. 9 is a horizontal view as taken substantially along the line 9—9 of FIG. 7;

FIG. 10 is a large detail view partly in vertical section corresponding to FIG. 8;

FIG. 11 is a view similar to FIG. 10 and taken immediately subsequent thereto;

FIG. 12 is a perspective view showing a modification of the carrier;

FIG. 13 is a vertical sectional view on an enlarged scale showing the cooperation of the carrier and a container in accordance with the modification of FIG. 12;

FIG. 14 is a fragmentary perspective view similar to FIG. 12, and showing a further modification;

FIG. 15 is a perspective view similar to FIG. 12, but with carriers assembled therewith, showing another modification of the invention;

FIG. 16 is a vertical sectional view on an enlarged scale taken along the line 16—16 in FIG. 15;

FIG. 17 is another perspective view showing a further modification of the invention about to be assembled with bottles;

FIG. 18 is a vertical sectional view showing a bottle assembled with the carrier of FIG. 17;

FIG. 19 is a view similar to FIG. 18, with a slight modification of the carrier;

FIG. 20 is a horizontal sectional view showing apparatus to be used in conjunction with the bottles for assembling the carrier therewith;

FIG. 21 is a vertical sectional view taken substantially along the line 21—21 in FIG. 20;

FIG. 22 is a perspective view showing a further slightly modified form of the invention with apparatus used in producing the package;

FIG. 23 is a vertical sectional view through the apparatus and package; and

FIG. 24 is a fragmentary vertical sectional view through the container and carrier.

In accordance with the present invention, the tops of the cans or other containers are closely protected by a plastic sheet or film, somewhat akin to the packaging known as "skin packaging." A distinction is to be drawn between skin packaging and blister or bubble packaging. Blister or bubble packaging is a process in which a usually transparent, more or less rigid film is first preformed, commonly by vacuum forming, and is then applied as a cover over an object. In skin packaging, a thermal forming plastic material in the form of a sheet or film is drawn down directly on top of and around an object and seals the object to a base material, most commonly a board, such as pasteboard or the like. In skin packaging, the plastic material is not preformed and set into shape, as in bubble packaging. The plastic material is drawn down practically skin tight around the object, and it is believed that this has given rise to the common term "skin packaging."

Skin packaging is usually accomplished by vacuum forming, utilizing a porous base member against which the plastic and packaged article are drawn. Sometimes carriers are used which require an adhesive for properly adhering to the base material. The thermal plastic material may be cellulose acetate, acetate butyrate, vinyl, or other plastic material. It is also known that a thin laminated plastic film or sheet of polyethylene resin and polyester film will adhere directly to a cardboard or the like base material without the application of a separate adhesive. In ordinary skin forming, vacuum is applied to the backside of the board or other base member, which must either have sufficient porosity, or which must be perforated to render the vacuum effective. Coated boards must be perforated to allow vacuum forming, and printed boards also present problems in vacuum forming. Conventionally, in skin packaging, the article to be packaged is spaced in from the edges of the board or base member, and the plastic sheet or film is sealed to the base member about the peripheral areas thereof, and is drawn tight against the article and base member. In general, the plastic sheet material lies entirely on one side of the base member or board.

Similarities to skin packaging, and distinctions therefrom, and in particular the principles of the present invention, will be seen with reference first to FIGS. 1–6. In these figures, there is shown a carrier 30 and a plurality of containers 32, illustrated as six, together forming a package 34. The carrier comprises a sheet of pasteboard or the like 36 having six circular apertures 38 therein, each of sufficiently large diameter to pass the uppermost portion of the container 32, illustrated as a can bead 40. In addition, along the median line of the pasteboard sheet 36, there is provided a pair of spaced apertures 42 of smaller diameter. A sheet of initially flat thermoplastic material 44, for example polyethylene, is initially spaced above the pasteboard sheet 36. The pasteboard or other sheet may have any suitable indicia imprinted thereon, in which case the plastic sheet 44 is transparent or translucent for allowing the indicia to be read therethrough.

The cans 32 are inserted through the apertures 38 from beneath the pasteboard or other base member 36, with the beads projecting slightly above the surface of the base 36. The plastic sheet 44, as will be set forth shortly hereinafter in greater detail, is heated and is stretched and formed by air pressure differential to conform closely to the top of the can 32 in each instance, as indicated at 46 in FIG. 4. The thermoplastic sheet 44 further extends along the inside of the bead 48, over the top of the bead at 50, down the outside of the bead at 52, and finally, under the bead at 54 and against the can side wall at 56. The material depends into the aperture 38 at 58, thereby centralizing the can and holding it in fixed relation in the aperture. As will be apparent, the complete envelopment of the can bead causes the plastic sheet 44 to support the can in each instance with its bead slightly above the level of the base 36. The inherent resiliency of the sheet plastic material 44 allows each can to move slightly relative to the base, whereby to avoid the imposition of localized strain thereon. Additionally, the plastic material completely covers the top and bead of each can, thereby maintaining these parts completely clean, so that one need not worry about sanitary conditions when simply puncturing the top of the can, and pouring or drinking directly therefrom.

As shown in FIG. 6, at each of the two apertures 42 the plastic sheet material 44 bulges down below the base 36, forming a protrusion or bubble 60 of larger diameter than the diameter of the aperture 42. This is done by expanding the protrusion 60 through the aperture 42 into a die 62 having a hole 64 therein with a diameter and bottom shape corresponding to that of the desired bubble 60. The bubbles 60 lock the plastic sheet 44 to the base 36, and hence no adhesive is necessary. Lifting of the package 34 is accomplished by inserting the thumb and one finger in these bubbles 60, and lifting, in the manner of a bowling ball. As will be appreciated, there is never any substantial force tending to separate the pasteboard or other base sheet 36 from the plastic sheet 44. Lifting of the package causes a force to be exerted by the thumb and finger up beneath the base sheet 36, while the weight of the cans or other containers pulls the plastic sheet down against the base sheet. Accordingly, there is no substantial force tending to separate the sheets of the carrier, and these bubbles or protrusions are quite sufficient to hold them together.

The apparatus and process for assembling the carrier 30 with the containers 32 are shown in FIGS. 7–11. The cardboard or other base member 36 preferably comprises an elongated strip 66 of material comprising a plurality of the base members 36. Similarly, an elongated web 68 of plastic film or sheet material corresponds to a large number of the plastic sheets 44. The base strip 66 and plastic web 68 are fed by known conveying mechanisms in step by step relation in horizontal, vertically spaced position. The web 68, and incidentally the strip 66, pass beneath a heat lamp 70 or the like for heating the plastic web to plastic temperature. After passing beneath the heat lamp 70 the plastic web 68 and cardboard strip 66 pass into position beneath a pneumatic manifold 72 of rectangular configuration, having depending walls 74 about its periphery. The manifold 72 is mounted on a rod 76 which is raised and lowered, as by a suitable cam mechanism, to raise and lower the manifold. A pneumatic connection is made to the manifold through a flexible hose 78 or the like, for introducing air or other fluid under pressure into the manifold at a desired time.

As will be apparent, the movement of the cardboard strip 66 and the plastic web 68 is from right to left. Similarly, the containers 32 are fed in from the right, as along a slide plate 80 under the influence of any suitable pusher means. The containers 32 are fed from the plate 80 onto an elevator platform 82 mounted on a post 84, for raising and lowering the platform 82 by any suitable or known means, such as cams. Above the containers 32 on the platform 82, and below the cardboard strip 66 and plastic web 68, there is a die generally indicated by the number 62. As best seen in FIG. 9, this die comprises a central die block 86 in which the openings 64 are provided. The block 86 is provided along its longitudinal sides with pairs of semicircular recesses or cavities 88, each complementary in configuration to a half of one of the containers 32. The die further includes outer die blocks 90, each having three recesses 92 of semicircular configuration confronting the recesses 88. The die blocks or members 86 and 90 normally are spaced apart as shown in FIG. 9 to allow the containers 32 on the platform 82 to be raised up through the separated confronting recesses 88 and 92 from the position shown in FIG. 7 to the position shown in FIG. 8. The die blocks 90 are then moved in to engagement with the center block 86 whereby firmly to grip the containers below the beads thereof, but without forming a completely air tight seal. Simultaneously with raising of the elevator platform 82 and closing of the die 62, the manifold 72 is lowered from the position shown in FIG. 7 to the position shown in FIG. 8. As will be apparent, raising of the containers 32 causes them to pass through the apertures 38 in the cardboard strip 66, and to stretch the plastic web 68 up within the manifold 72, the side walls 74 of the manifold holding the plastic material down against the cardboard, and the cardboard down against the die 62.

When the parts are first brought together, as aforesaid, the relation thereof is shown in FIG. 10. That is to say, the plastic sheet material is stretched across the tops, specifically the beads 40, of the containers 32. The side walls 74 of the manifold press the plastic material down against the base sheet 36. Subsequently, air under pressure is introduced into the manifold, and the still plastic sheet material 36 is forced into conforming relation with the tops of the cans as shown in FIG. 11, and as previously discussed in connection with FIG. 4. As will be apparent, no special perforations need be formed in the cardboard sheet or base 36, and the cardboard base or sheet may be entirely impervious to air. Air trapped beneath the plastic material simply escapes down the side walls of the cans and out beneath the base member when air pressure is applied to conform the plastic sheet material to the cans. The cans or other containers are cool relative to the heated plastic sheet material, and the plastic sheet material chills and sets practically immediately upon being brought into contact with the cans. As further will be understood, the application of air pressure forces the material down into the die apertures 64 to form the finger gripping bubbles 60. Subsequently, the die members are separated, the elevator lowers, and the manifold raises and the assembled cans and carrier are moved on to another station by any suitable means for severance of the carrier 30 from the remainder of the plastic web.

A modification of the invention is shown in FIGS. 12 and 13, similar parts therein being identified by similar numerals with the addition of the suffix a. In this embodiment of the invention, the plastic sheet 44a underlies the cardboard or the like base 36a. The base is provided with apertures 38a which have strips 94 radiating therefrom to provide a plurality of circumferentially disposed fingers 96. The fingers extend to a base circle 98 of larger diameter than the beads 40 of the containers 32, while the inner diameter thereof, comprising the opening or aperture 38a is less than the can body diameter. Accordingly, when the cans are pushed through the carriers 30a from the bottom thereof, the plastic sheet material is stretched from the plane thereof as at 100, with the fingers 96 deflecting up along the outer surface of the deflected plastic 100. The fingers 96 engage beneath the bead 40, thereby providing additional support for each can. Air under pressure may be used as disclosed heretofore to cause the plastic material to adhere tightly to the can bead and to the top of the can, as previously disclosed. However, due to the nature of this particular embodiment of the invention, a satisfactory package can be obtained without the use of air pressure. The fingers 96 will cause the plastic material to engage beneath the beads, while mere stretching thereof will cause the plastic material to engage along the outer surfaces and the top portions of the beads. Of course, the plastic material will not be in surface engagement with the top surfaces of the can lids, if air pressure is not used. The projection of the plastic material out above the fingers 96 as at 54a causes the plastic material to be held up against the underside of the cardboard base 30a, whereby it is not necessary to use an adhesive to secure the cardboard and plastic togther, nor to rely on self-adhering qualities of the plastic material. The thumb and one finger may simply be inserted through the finger holes 42a, between the cardboard and plastic, with no finger accommodating bubbles formed in the plastic, or such bubbles can be formed as previously disclosed. Alternatively, in the present embodiment, the plastic material could be removed from the area of the finger holes 42a, since these are not relied on to hold the plastic and cardboard together.

The successive carriers are preferably initially supplied in strip or web form, as previously disclosed, and a weakened or score line 102 conveniently may be provided between adjacent carriers to allow ready separation from one another.

A further modification of the invention is shown in FIG. 14, similar parts again being identified by similar numerals with the addition of the suffix b. The radial slits 94b and intervening fingers 96b again are provided, whereby to provide a strutting action along with the plastic adherence to the containers, thereby again providing a particularly rigid package. The distinction in the modification of FIG. 14 is that a tear strip 104 is provided down the center of the carrier by means of scored or otherwise weakened lines 106. The score lines may be only in the cardboard, or may be also in the plastic material. The tear strip allows ready separation of the package into two halves, thereby allowing vending of three containers at a time, instead of six, or facilitating handling of the package and separation of containers therefrom by the consumer.

A further embodiment of the invention is shown in FIGS. 15 and 16. Similar parts again are identified with similar numerals, this time with the addition of the suffix c. The distinguishing feature in this form of the invention is that the cardboard or other base member is omitted, only the plastic sheet 44c being present. The plastic conforms closely to the top of the can, and about the bead, in the manner discussed with regard to FIG. 4, except that no reinforcing base member is provided. It will be observed that the underlying portion 58c beneath the bead has a flat bottom, rather than being somewhat depressed as in FIG. 4, since the plastic sheet directly abuts the container holding dies. In FIG. 4, the die underlies the cardboard base, and the plastic material at 58 extends down through the hole 38 about each container to the top of the supporting dies. The carrier in FIG. 15 and in FIG. 16 provides complete coverage for the top and bead of the container, with a somewhat more flexible interconnection between adjacent containers. It is contemplated that this would be useful with containers of lighter weight, having less tendency to pull away from the carrier.

The invention has been described heretofore specifically in connection with cans. The invention also is applicable to carrying bottles, as is shown in FIGS. 17 and 18. Thus, the containers 32d are illustrated as being bottles of the type having a neck 108 at the upper end thereof, surmounted by a cap 110, which may be of the conventional crown type having a lateral crown or skirt 112 projecting from the bottom thereof. As is shown in FIGS. 17 and 18, the cardboard or other base sheet 36d (similar numerals again are used to identify similar parts, with the addition of the suffix d) overlies the plastic material 44d. The plastic material extends up through the apertures 38d in the cardboard, and closely conforms to the exterior surface of the cap, lying along the top surface of the cap at 46d, the outer periphery thereof at 52d, projecting out at 114 on the crown, and underlying the crown at 54d. The plastic sheet material is locked to the cardboard base sheet by projection through the apertures, and out over the outer surface of the cardboard in the vicinity 114.

As has been described in connection with FIGS. 17 and 18, the plastic sheet material 44d underlies the base 36d.

Alternatively, as shown in FIG. 19, the plastic sheet material 44e (similar numerals again are used to identify similar parts, with the addition of the suffix e), overlies the cardboard or the like base 36e. Plastic bubbles 60e extend down through the base openings 42e to interlock the plastic material and the base member.

Although a die similar to that previously disclosed can be used for gripping the bottles of FIGS. 17, 18 or 19, a preferred form of die is shown in FIGS. 20 and 21. In these figures, the numbering system of FIGS. 17 and 18 is continued, that is similar numerals are used to identify similar parts, with the addition of the suffix d. Thus, the die 62d has a pair of end blocks or guide plates 116 having diagonal guide surfaces 118 parallel to one another. There are two similar and complementary die block segments 120 movable toward and away from one another along the diagonal guide surfaces 118. Such die block segments include protruding fingers 122 extending into complementary passages 124. The passages are terminated by semicircular surfaces 126 complementary to the bottle necks 108, while the ends of the fingers 122 are provided with concave surfaces 128 of slightly less than a semicircle, also complementary to the bottle necks 108. Suitable mechanism (not shown) is provided for moving the die block segments back and forth toward one another.

The carrier parts and a manifold cooperate with the dies in the same manner as previously described.

In instances in which it is desired to provide bubbles or blisters in the plastic sheet material extending through the cardboard base, complementary half apertures 130 are provided on confronting faces of certain of the fingers 122, as shown in FIG. 20.

In some instances it may be desirable to give a firmer interlock between the plastic and base member of the carrier adjacent the periphery thereof. Additionally, or alternatively it may be desired to provide greater rigidity about the periphery of the carrier. To this end, a further modification of the invention is shown in FIGS. 22–24, wherein similar parts again are identified by similar numerals with the addition of the suffix f. In this instance, the cardboard or the like base 36f is provided with spaced elongated slots 132 about the periphery thereof. The die 62f is shown as being all in a single piece, with cavities 134 therein of sufficient size to receive the cans 32 including the beads thereof. The die is provided in the upper face with a peripheral groove or recess 136, and the depending sidewall 74f of the manifold 72f is provided with a complementary depending rib 138. As a result, when the parts are brought together in a manner substantially similar to that previously described, a certain amount of the plastic material is extruded at 140 down through the elongated slots 132 in the base. Preferably, the top of the groove 136 is slightly wider than the width of the slots 132, whereby a small amount of the plastic material is extruded out at 142 beneath the undersurface of the cardboard base 36f. This provides a strong mechanical interlock between the plastic and the cardboard adjacent the periphery of the carrier 30f. Intermediate the slots 132, the cardboard or pasteboard base is simply embossed complementary to the rib 138 and groove 136. In fact, the slots 132 can be omitted completely, in which case a peripheral embossment will be formed in the base, lending greater rigidity thereto about the periphery thereof. The plastic material will still interlock with the base if the surface of the base is not too smooth, as the plastic material in the embossed area will tend to extrude into the pores or surface irregularities of the base.

Although reference has been made primarily to mechanical interlocking of the plastic sheet material in the base in each instance, it will be understood that adhesives can be used to augment the mechanical interlocking, as is known in the art, or the plastic material could be of the type adhering to the base without the necessity of a separate adhesive. Furthermore, the plastic sheet material could be bonded to the base before being assembled with the containers.

In all forms of the invention the plastic material tightly envelops the top of the container, thereby concurrently supporting the container, and maintaining the top thereof sanitary. In most instances, a relatively rigid base member of cardboard or pasteboard or the like is provided, lending additional rigidity to the carrier and resulting package.

Although various embodiments of the invention have been shown and described herein, it is to be understood that these are for illustrative purposes only. Various changes in structure will no doubt occur to those skilled in the art, and will be understood as forming a part of this invention insofar as they fall within the spirit and scope of the appended claims.

The invention is claimed as follows:

1. The method of producing a container package which comprises supporting a plurality of containers with transversely enlarged portions adjacent the upper ends in parallel relation, supporting a base of relatively rigid material having a plurality of apertures therein and a relatively flexible sheet in substantial parallelism therewith, relatively inserting said containers respectively through the apertures of said base, and conforming said relatively flexible sheet to the upper ends of said containers and beneath the transverse enlarged portions.

2. The method of producing a container package which comprises supporting a plurality of containers with transverse enlarged portions adjacent the upper ends in parallel relation, supporting a base of relatively rigid material having a plurality of apertures therein and a relatively flexible sheet in substantial parallelism therewith, relatively inserting said containers respectively through the apertures of said base, sealing off an area of said relatively flexible sheet, and establishing a pressure differential across the sealed off area of said sheet to conform said sheet to the upper ends of said containers and beneath the transverse enlarged portions thereof.

3. The method of producing a container package which comprises supporting a plurality of containers with transverse enlarged portions adjacent the upper ends in parallel relation, supporting a base of relatively rigid material having a plurality of apertures therein, supporting a relatively flexible sheet in parallel relation with said base and between said base and containers, and relatively moving said base and flexible material toward said containers and inserting the containers respectively through the apertures, stretching the flexible material through said apertures and over the ends of said containers.

4. The method as set forth in claim 3 wherein the bases are provided with radial slots providing fingers about said apertures, and further comprising deflecting said fingers up into strutting relation beneath the enlargements of said containers.

5. The method of producing a container package which comprises supporting a plurality of containers with transverse enlarged portions adjacent the upper ends in parallel relation, supporting a base of relatively rigid material having a plurality of apertures therein, and a relatively flexible sheet in substantial parallelism therewith, relatively inserting said containers respectively through the apertures of said base, sealing off an area of said flexible material circumscribing said plurality of containers and simultaneously peripherally embossing said flexible sheet and said relatively rigid base, and establishing a pressure differential across the sealed off area of said flexible material to cause said flexible material to conform closely to the upper ends of said containers including the enlargements.

6. The method of producing a container package which comprises supporting a plurality of containers with transverse enlarged portions adjacent the upper end in parallel relation by means of a die mechanism having a substantially flat upper surface, supporting a base of relatively rigid material having a plurality of apertures therein and a relatively flexible sheet in substantial parallelism therewith, relatively moving said die mechanism and the containers supported thereby toward the base and flexible sheet and thereby inserting said containers respectively through the apertures of said base, one of said base and said flexible sheet thereafter lying in engagement with the upper surface of said die mechanism, sealing off an area of said flexible sheet circumscribing said containers, and establishing a pressure differential across the sealed off area to conform said relatively flexible sheet to the upper ends of said containers and beneath the transverse enlarged portions.

References Cited in the file of this patent
UNITED STATES PATENTS

| | | |
|---|---|---|
| 2,814,920 | Darrow et al. | Dec. 3, 1957 |
| 2,975,891 | Stone | Mar. 21, 1961 |
| 2,982,400 | Andre | May 3, 1961 |
| 2,986,857 | Ganz | June 6, 1961 |
| 3,046,711 | Harrison | July 31, 1962 |